Aug. 30, 1932.     R. S. DANFORTH     1,874,849
CATARACT CONDENSATION APPARATUS
Filed March 21, 1930    2 Sheets-Sheet 1

RICHARD S. DANFORTH
INVENTOR

Paul W. Prizeman
ATTORNEY

Aug. 30, 1932.  R. S. DANFORTH  1,874,849
CATARACT CONDENSATION APPARATUS
Filed March 21, 1930   2 Sheets-Sheet 2

RICHARD S. DANFORTH
INVENTOR
ATTORNEY

Patented Aug. 30, 1932

1,874,849

UNITED STATES PATENT OFFICE

RICHARD S. DANFORTH, OF SAN FRANCISCO, CALIFORNIA

CATARACT CONDENSATION APPARATUS

Application filed March 21, 1930. Serial No. 437,855.

My invention relates to the apparatus variously known as fractionators or bubble towers, though in its construction it differs completely from bubble towers of ordinary patterns.

The principles of my invention are also applicable to condensers such as steam condensers and other devices, in which a vapor is brought into direct contact with a liquid.

Among the objects of my invention are to provide a device, wherein a vapor is condensed in direct contact with a liquid, in which the pressure drop through the device is minimal; to provide a fractionator in which a fractionation may be accomplished at extremely low pressures; to provide a device in which the undesirable effects of by-passing are avoided; to provide an apparatus in which the energy required for passing the vapor through the device is supplied largely by the liquid rather than the vapor, and to provide a fractionator in which the entire body of liquid in a given stage is substantially uniform in quality.

My invention possesses numerous other objects and features of advantage, some of which with the foregoing will be set forth in the following description of my invention. It is to be understood that I do not limit myself to this disclosure of species of my invention as I may adopt variant embodiments thereof within the scope of the claims.

The nature and scope of my invention may best be appreciated from an inspection of the following drawings, in which, Fig. 1 is a vertical elevation of a preferred form of my improved fractionator, parts being broken away to show the internal construction.

Fig. 2 is a plan view of any one of the trays of which the apparatus is composed, as for instance the tray A—A of Fig. 1, and Fig. 3 is a longitudinal section of a modified condensing plate.

A preferred form of my invention comprises the shell 10 and the heads 11—11, the shell being preferably of a rectangular cross section as indicated at Figs. 2 and 5. This rectangular section is highly preferable, but I do not limit myself to it. 12 is a trough non-leakably attached to the shell both at its bottom outside edge and at its end, as by welding. This trough has an overhanging lip 13 which is given a slight slope downwardly. 14—14 are plate sections of sheet metal, as for instance tank plate, which may have upturned ends and rest on the angle or strap 15 which is bolted or riveted to the shell 10 or may be flat plates welded at their ends to the shell. The object in turning up the ends of the sections when they are not welded to the shell is to avoid the flowing of liquid over the ends, which would disturb the functioning of the apparatus. It will be understood that each group of plate sections, together with the upper and lower troughs, or the equivalent thereof, constitute a plate unit or condensing stage which must be nonleakably fitted within the shell so as to pass the upward-flowing vapor solely through the slots 17 or their equivalent.

Figure 1:
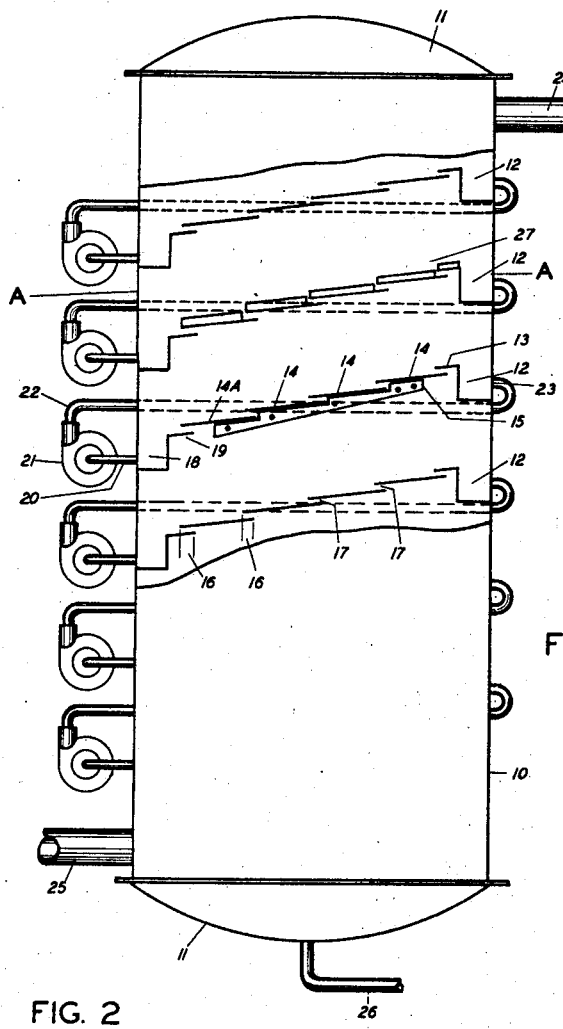
Figure 4:
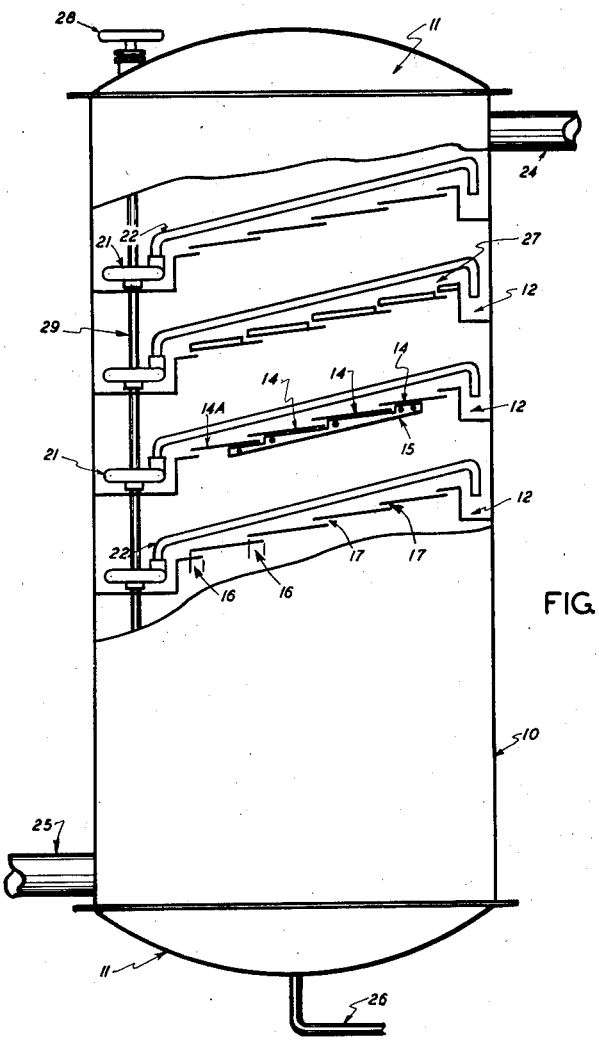
Figure 4 is a view corresponding to Figure 1 of a modification in which the liquid return means is housed entirely within the fractionator.

These plates are preferably so placed within the shell that they overlap, as indicated at 16 in Figs. 1 and 4, though this is not essential, and so that there is a material opening between the overlapping edges as indicated at 17 in Fig. 1. The plates should also be given a downward slope away from the trough 12, the extent of this slope and the relation between the opening and the overlap, if any, being discussed in later paragraphs.

The lowermost plate which is designated 14A in Figs. 1 and 4 drains into a trough 18 having an upward looking lip 19, this trough being nonleakably attached at its ends and at its edge to the wall of the shell.

Figure 2:
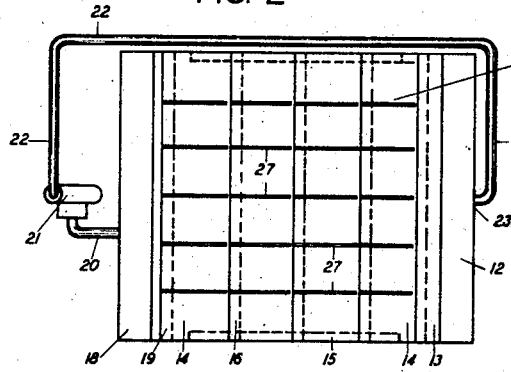

Liquid introduced into the trough 12 fills it to overflowing, drips from the edge of the lip 13 onto the uppermost of the plate sections numbered 14 and from section to section into the trough 18. Here it enters a pipe 20 which conducts it into a centrifugal or other pump 21, by which it is discharged into a pipe 22 which passes around the apparatus as shown in Fig. 2 and reenters trough 12 at the point indicated at 23. The liquid is thus circulated from the lower trough to the upper trough and by gravity over the plate sections 14 back to the lower trough, the amount of liquid thus circulated being restricted only by the capacity of the pump used and the slope of the plates.

The liquid passing over the plates and falling from one plate to the next may therefore be restricted to an amount which will drip from plate to plate, or to an amount which will gently cascade from one plate to another, or it may be increased to an amount which will form a rapidly flowing sheet over the whole series of plates. The quantity which may be circulated is, as said, limited by the slope of the plates, as it will be obvious that a larger quantity may be flowed over a series of plate sections having a steep inclination than over a series having a lowered inclination, it being essential to the functioning of my apparatus that the liquid flow from section to section without backing up into the slots 17 and thus falling from one tray to the next below.

The excess liquid removed from the vapor by condensation overflows from trough 18 into the trough next below, where it intermixes with the liquid in the next lower series, and thus gradually makes its way from series to series into condensate outlet 26.

Fig. 1 also indicates a vapor outlet 24, a vapor inlet 25 and an outlet 26 for condensate.

The pumps shown are illustrative only and pumps located outside the shell and circulating through pipes also located outside would hardly be the best construction. A separate centrifugal or other pump may be located in each of the troughs 18, or the battery of pumps may be placed horizontally in the bottom of the fractionator itself and suitable pipe connections made, each individual pump drawing from a trough 18 and discharging into a trough 12, or a multistage centrifugal pump may be used connected in the same manner, one pair of troughs being connected to each stage of the pump. I do not limit myself to the type of pump used, nor to its location, but only to the provision of a separate pumping or liquid circulating means for each pair of troughs, the functioning of the apparatus being entirely vitiated if the liquids from different pairs of troughs be intermixed in a single pumping means. In place of a distributing trough a pipe or passage way may be used, having orifices adapted to deliver the proper amount of liquid to each portion of the top plate.

Figure 5:
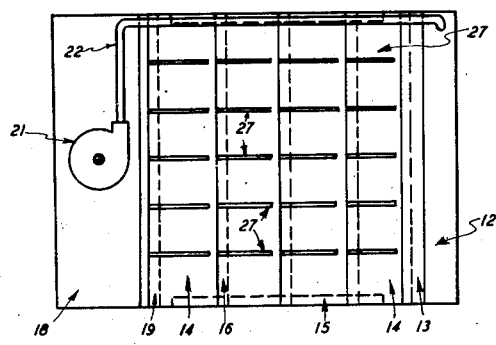
Figure 5 is a view corresponding to Figure 2 of the modification showing the liquid return means entirely within the fractionator shell. The numbering of relative parts in these figures is the same as in Figures 1 and 2.

In the showing of Figures 4 and 5 it is to be understood that the centrifugal pumps within the shell may be driven by any appropriate means, such as a common shaft connecting all of the impeller shafts and driving them in unison. Such a shaft may be driven from outside the fractionator shell and an appropriate gland used to seal the shell around the shaft. Or, each pump or group of pumps may be independently driven by an explosion-proof electric motor or a turbine.

Figure 3:
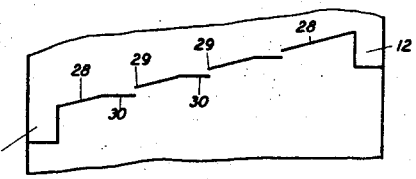

The above described assembly of plate sections combined in the form of a plate unit is substantially an inclined apertured surface arranged to cascade the liquid across the apertures. The separate plate sections assembled as shown may be replaced by a single plate provided with slots arranged across the direction of liquid flow. If the plate so slotted be perfectly flat, that is, if the edges of the slot be not distorted from the original plane, there may be some tendency toward the passage of liquid through the slot unless the inclination given the plate be very steep, and a part of the advantage of the device will be lost. If, however, the slots be distorted, as by giving the upward edge a slight inclination upward (i. e., toward the horizontal as the plates are set in an inclined position), or still better, if the lower edge of the slot be bent downward as shown in Fig. 3, the benefit of the ejection function of the rapid liquid flow is preserved in its entirety and the single plate is fully equivalent to the form shown in Fig. 1. In Fig. 3, 28—28 is a single plate which may be parted along the lines indicated at 29—29 by punching, shearing or other well known means, and the lower side of the cut thus formed bent downwardly as at 30—30.

If the apertured plate is to be left flat the aperture must be of material width to permit the passage of vapors between the opposing edges of the slot, but where one side is deformed as in Fig. 3 the original slot may be of immaterial or minimum width, as in this case the edges are not in opposition and the vapor passage is formed by the vertical interval between the edges.

The functions of a condensing fractionator, of which the conventional bubble tower is a familiar example, are too well known to need any elaborate description. Their purpose is to remove as condensates from a mixture of vapors of bodies having different boiling points, a desired portion of the higher boiling constituents, leaving the lower boiling constituents to pass out of the apparatus in the vapor form. This is accomplished in the bubble tower by maintaining a layer of liquid of slight depth on a horizontal tray having short nozzles through which vapors pass upward, these nozzles being surmounted by bells or cups which force the vapor to pass downward into and allow it to bubble up through the layer of liquid.

By this continuous passage of vapor through liquid the vapor is slightly cooled at each such passage, a corresponding quantity of vapor is condensed and is added to the supply of liquid on the plate, and volatile bodies which have been condensed or entrained in the liquid on the plate are re-evaporated and join the main body of vapor passing upwardly through the apparatus, the excess liquid accumulating on each plate overflowing through a vapor trap onto the plate next beneath and finally into a bottom outlet from the apparatus.

One main objection to the bubble tower type of fractionator is that it resists the upward passage of the vapor by an amount equal to the hydraulic head of the liquid on the total number of plates. There is also a considerable vapor pressure loss caused by the friction, turbulence and velocity head losses of the vapors passing through the bubble caps.

In the case of bubble towers which operate under atmospheric or higher pressures this is usually a matter of no importance, as sufficient vapor pressure is available to carry the vapor freely through all the bubble caps. In operating at very high degrees of vacuum, which in modern practice are often of the order of 5 mm., the pressure loss of the vapor becomes a very serious impediment. In long fractionating columns, even if a substantially complete vacuum be obtained on the outlet, the drop in pressure through the fractionator may amount to 25 or even 50 mm., which pressure drop is obviously the limit to which the pressure may be reduced in the distillation means.

In the use of my improved fractionator the pressure drop due to the resistance of the liquid through which the vapors are forced to pass, may feasibly be reduced to zero or even to a negative quantity. The more nearly the plates 14 approach to a level position, the greater will be the tendency of the liquid passing over the plates to back up through the slots 17 formed by the space between the two plates.

If these plates be set level, the pressure drop through the apparatus would probably approximate that of a bubble tower having the same vapor passage area, i. e., the hydrostatic head would be practically the same. By giving the plates a steep pitch the velocity of the liquid being circulated over the plates may be raised to such a point that the flowing liquid will actually entrain and draw into the liquid a very material proportion of vapor and thus the pressure drop may be reduced to a negative quantity. At an intermediate point of inclination to horizontal, such as is most suitable for ordinary purposes, the entraining effect of the cascade may be made to approximately or exactly balance the hydrostatic head and the pressure drop thus be reduced to zero, or held at any desired value. The vapor pressure losses in passing through the bubble cap or aperture are also largely eliminated.

It is to be noted that whereas in the ordinary bubble tower the energy is derived only from the vapor pressure at the bottom of the fractionator, in my device a portion or all of this energy is derived from the potential energy of the liquid as it flows over the plates.

The fractionator of my invention possesses a number of advantages over the conventional bubble tower. The constant agitation of the liquid by the pump and in its flow mixes it and keeps the quality in each stage uniform. This movement also eliminates the tendency to "by-pass", that is, for successive bubbles to follow the same path due to the reduction in hydrostatic head caused by the first bubble breaking through the liquid. Since the liquid is in motion and the plates themselves are inclined, it is unnecessary that the device be as carefully leveled as the conventional type in order to equalize the passage of gas through all portions of the liquid. Finally, the area of the plates in each stage is more economically utilized, since the space occupied by the caps in the usual type accounts for a large proportion of the area, and this waste of space does not occur in the fractionator of my invention.

The above described apparatus, in any of its forms, may be applied to the condensation of steam or other vapors. In a barometric or similar type of condenser cascading plates may readily be so arranged that the liquid will flow from one apertured surface to another, thus producing an extremely intimate contact of the cooling liquid with the vapor and also eliminating pressure drop. If the plates or stages are alternated in slope instead of sloping in a common direction as shown, the circulating pumps shown in Fig. 1 will not be required. Obviously, the conditions encountered in complete condensation are substantially the same as in fractional condensation, and many of the advantages of my invention apply equally to both operations.

I claim as my invention:

1. In a vapor fractionator having a shell, a lower inlet for mixed vapors, an upper outlet for fractionated vapors and a bottom outlet for condensate; means for fractionating said vapors comprising: a plurality of inclined plate sections so arranged that a liquid flowing down the inclination of one section will be projected onto the section next below as a substantially continuously moving sheet; slots for the upward passage of vapors formed by leaving a material vertical interval between the adjacent edges of each pair of said sections; means for distributing liquid in longitudinal uniformity over the uppermost of said sections; means for collecting liquid flowing over the lowermost of said sections, and means for continuously returning liquid from said receiving means to said distributing means, the whole being so arranged within said shell that vapor may pass upwardly only through said slots.

2. Apparatus substantially as and for the purpose set forth in claim 1, in which the means for returning liquid from said receiving means to said distributing means includes a pumping means.

3. Apparatus substantially as and for the purpose set forth in claim 1, in which the means for returning liquid from said receiving means to said distributing means includes a pumping means located within said shell.

4. Apparatus substantially as and for the purpose set forth in claim 1, in which said distributing means is a trough, said trough having a lip adapted to distribute liquid over the uppermost of said plates.

5. Apparatus substantially as and for the purpose set forth in claim 1, in which said receiving means is a trough adapted to receive liquid flowing from the lower edge of said lowermost edge of said lowermost plate.

6. In a fractionator for mixed vapors having a shell, a lower inlet for mixed vapors, an upper outlet for fractionated vapors and a bottom outlet for condensate, means for fractionating said vapors comprising: a plate inclined to the horizontal; slots across said plate adapted to the upward passage of vapors; means for distributing liquid over the upper edge of said plate; means for causing said liquid as it flows down said plate to be projected over said slot as a substantially continuous sheet moving in the direction of vapor flow through said slot; means for collecting said liquid from the lower edge of said plate, and means for continuously returning said collected liquid to said distributing means.

7. In a vapor fractionator having a shell, a lower inlet for mixed vapors, an upper outlet for fractionated vapors, and a bottom outlet for condensate, a plurality of means for fractionating said vapors each comprising: a plurality of inclined plate sections so arranged that a liquid flowing down the inclination of one section will be projected onto the section next below as a substantially continuous moving sheet and having slots for the upward passage of vapors formed by leaving a material vertical interval between the adjacent edges of each pair of said sections; means for distributing liquid in longitudinal uniformity over the uppermost of said sections, means for collecting liquid flowing over the lowermost of said sections, and means for continuously returning liquid from said receiving means to said distributing means; said fractionating means being placed in vertical superposition within said shell and at substantially a common angle of inclination, and the whole being so arranged within said shell that vapor may pass upwardly only through said slots.

In witness that I claim the foregoing I have hereunto subscribed my name this 15th day of March, 1930.

RICHARD S. DANFORTH.